H. BOLAS.
MEANS FOR FOLDING THE PLANES OF AIRCRAFT.
APPLICATION FILED JAN. 6, 1921.

1,395,628. Patented Nov. 1, 1921.

HAROLD BOLAS.
INVENTOR.
BY George T. Folkes
ATTORNEY.

UNITED STATES PATENT OFFICE.

HAROLD BOLAS, OF CLIFTON, BRISTOL, ENGLAND, ASSIGNOR TO GEORGE GEACH PARNALL, OF BRISTOL, ENGLAND.

MEANS FOR FOLDING THE PLANES OF AIRCRAFT.

1,395,628.      Specification of Letters Patent.      Patented Nov. 1, 1921.

Application filed January 6, 1921. Serial No. 435,432.

*To all whom it may concern:*

Be it known that I, HAROLD BOLAS, a subject of the King of Great Britain, residing at 7 Windsor Terrace, Clifton, Bristol, England, have invented an Improved Means for Folding the Planes of Aircraft, (for which I have filed an application in England, No. 22,512, dated Sept. 12, 1919;) and I do hereby declare the following to be a full, clear, and exact description of the same.

This invention has reference to improvements in aircraft of the seaplane and aeroplane type, and has for its object to improve the means whereby the main planes can be folded for reduction of the dimensions for transit and storage.

The folding or hinging of the planes of aircraft is a common practice.

In an aeroplane of the monoplane type the plane has been carried obliquely by axles which axles are themselves so mounted as to form a V placed transversely of the machine and in such a way that the point of the V is turned downward and forward so that when the planes are brought into the same plane they are at normal incidence, while the incidence increases or diminishes according to whether the wings are displaced toward the front or toward the rear. The present invention is applied to aircraft of the multiplane type as distinguished from a monoplane, and moreover to multiplanes wherein the planes are arranged in staggered formation.

The present invention comprises aircraft of the heavier than air multiplane type wherein the planes are arranged in staggered formation and the main planes are adapted to be folded; this invention resides in arranging the hinge lines of the planes as viewed from the side upon a line which is parallel or substantially parallel to an imaginary line joining the leading edges of the main planes. Preferably the said hinge line is a line joining the centers of the rear spars of the staggered planes. When viewed from the front the said hinge line is inclined to the vertical in a degree relative to the inclination of the hinge line as viewed from the side, functioning to produce any desired upward or downward motion of the planes when folded.

The invention will now be described in conjunction with the accompanying sheet of drawings as applied to a biplane in which the planes have a staggered disposition, only so much of the aircraft being shown by the accompanying drawings as is necessary to an understanding of the present invention.

Figure 1:
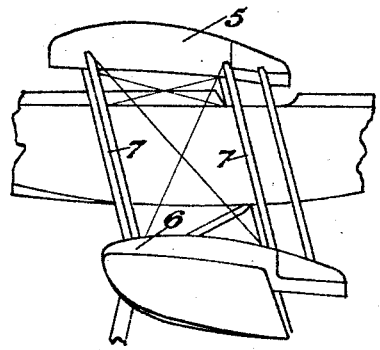
Figure 1 is a side elevation of part of the fuselage and of the two main planes.
Figure 3:
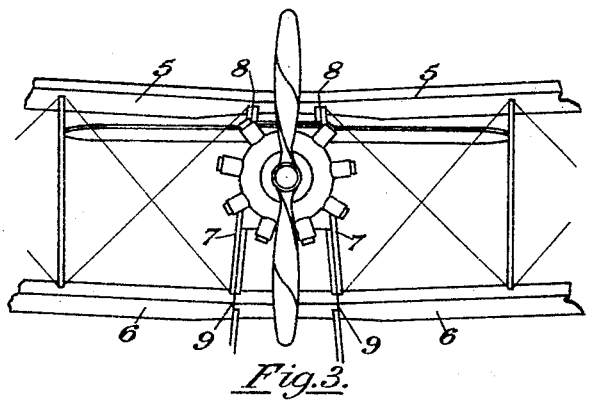
Fig. 3 is an elevation viewed on the front of the fuselage.
Figure 2:
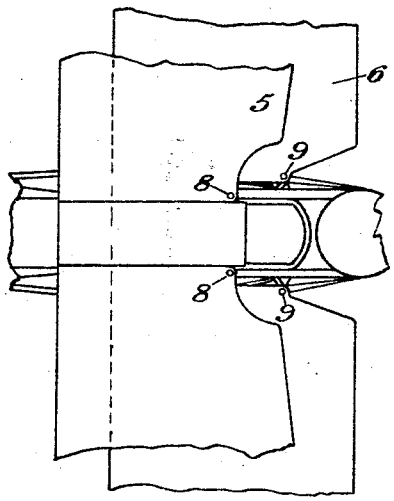
Fig. 2 is a plan of Fig. 1.
Figure 4:
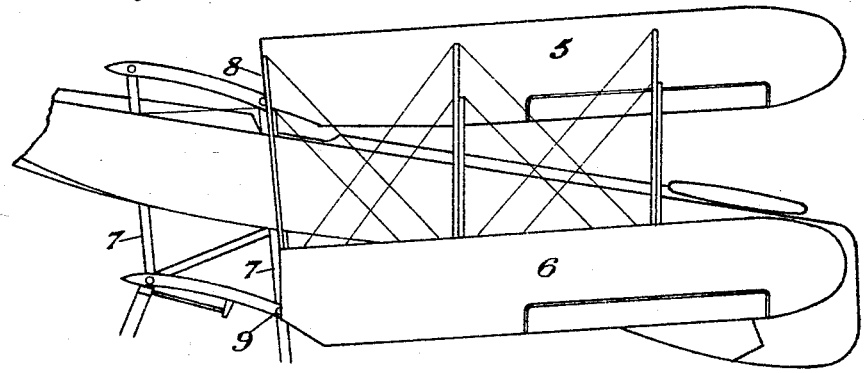
Fig. 4 is a side elevation showing the main planes when folded back.

The top main plane 5 is located forward of the bottom main plane 6, the main struts 7 connecting the said planes being inclined rearwardly from the top plane 5 to the bottom plane 6 which inclination to the vertical will be termed the angle of stagger, this angle preferably being measured when the line of the propeller shaft is horizontal. The said struts 7 when viewed from the forward or rear end of the fuselage (see particularly Fig. 3) are inclined outwardly from the top plane 5 to the bottom plane 6 which inclination to the vertical will be termed the angle of cant. In this way the angle of the spars of the main planes to the horizontal when folded (see particularly Fig. 4) as viewed from the side is the difference between the angle of stagger and the angle of cant. By this means if the angle of stagger is made equal to the angle of cant the spars of the planes when folded will lie horizontally as viewed from the side when the line of the propeller shaft is horizontal, or alternatively, the difference between the two angles may be determined so as to permit the planes to fold horizontally with the tail of the machine resting on the ground. The hinge points of the plane 5 are clearly indicated by the circles 8 in Fig. 2 and the hinge points of the bottom plane 6 are indicated by the circles 9 in the same figure, these points also clearly indicate the correlation of the angle of stagger to the angle of cant, the angle of stagger being proportional to the distance between vertical transverse planes passing through the center of the point 8 and the center of the point 9, and the angle of cant being proportional to the distance between vertical longitudinal planes passing through the center of the said points 8 and 9.

By the said means a machine having its planes arranged with a considerable stagger and therefore having the known advantages as regards vision and ease of balance, may be folded in a simple manner requiring only the minimum folding effort, (i. e., the center of gravity of the folded portion of the plane is not raised during the folding operation) and moreover this result may be achieved with either the tail lifted or resting on the ground.

Claim:—

In aircraft of the heavier than air multiplane type wherein the planes are arranged in staggered formation and the main planes are adapted to be folded, forming the hinge lines of the planes as viewed from the side upon an inclined line which is parallel or substantially parallel to an imaginary line joining the leading edges of the main planes, said hinge lines when viewed from the front being inclined to the vertical the bases of the hinge lines being farther apart than the upper ends thereof.

In testimony whereof, I have signed my name to this specification.

HAROLD BOLAS.